(12) United States Patent
Deng et al.

(10) Patent No.: US 11,086,433 B2
(45) Date of Patent: Aug. 10, 2021

(54) DISPLAY PANEL AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yin Deng, Beijing (CN); Chengwei Ji, Beijing (CN); Shiqi Chen, Beijing (CN); Chunmiao Tang, Beijing (CN); Tian Wei, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/932,914

(22) Filed: Jul. 20, 2020

(65) Prior Publication Data

US 2021/0165516 A1 Jun. 3, 2021

(30) Foreign Application Priority Data

Nov. 29, 2019 (CN) .......................... 201922121534.0

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05); *G06F 3/0448* (2019.05)

(58) Field of Classification Search
None
See application file for complete search history.

(56) References Cited

U.S. PATENT DOCUMENTS

| 10,001,677 B2* | 6/2018 | Sun | G02F 1/134309 |
| 2016/0103547 A1* | 4/2016 | Lu | G06F 3/0488 |
| | | | 345/174 |
| 2016/0357310 A1* | 12/2016 | Wang | G06F 3/0416 |
| 2017/0192580 A1* | 7/2017 | Jung | G02F 1/134363 |

\* cited by examiner

*Primary Examiner* — Duane N Taylor, Jr.
(74) *Attorney, Agent, or Firm* — Calfee, Halter & Griswold LLP

(57) ABSTRACT

A display panel includes: a first substrate and a second substrate oppositely disposed; and a common electrode layer, a plurality of touch signal lines and a plurality of redundant signal lines disposed on a side of the first substrate facing the second substrate. The common electrode layer comprises a plurality of electrode blocks independent from each other; the plurality of touch signal lines extend in a first direction and correspond to the plurality of electrode blocks in one-to-one correspondence, and the plurality of touch signal lines are electrically connected to the corresponding electrode blocks, respectively; and the plurality of redundant signal lines extend in the first direction, wherein respective portions of each of the redundant signal lines located between adjacent ones of the plurality of electrode blocks in the first direction are disconnected to form redundant sub-conductive lines corresponding to each of the plurality of the electrode blocks, and the redundant sub-conductive lines are electrically connected to corresponding electrode blocks, respectively.

18 Claims, 4 Drawing Sheets

DISPLAY PANEL AND DISPLAY DEVICE

CROSS-REFERENCE

The present application claims the priority to the Chinese Patent Application NO. 201922121534.0 filed on Nov. 29, 2019, the entire contents of which are hereby incorporated by reference.

TECHNICAL FIELD

The present disclosure relates to the field of display technologies, and in particular, to a display panel and a display device.

BACKGROUND

As an input medium, a touch screen is the simplest, convenient, and natural way of human-computer interaction at present. Therefore, the touch screen is increasingly used in various electronic products. In order to reduce cost of various electronic devices and make the electronic devices lighter and thinner, the touch screen is usually integrated into a liquid crystal display panel, such as a common In-cell touch display panel.

SUMMARY

The present disclosure provides a display panel, including:

a first substrate and a second substrate oppositely disposed; and a common electrode layer, a plurality of touch signal lines and a plurality of redundant signal lines disposed on a side of the first substrate facing the second substrate;

wherein, the common electrode layer comprises a plurality of electrode blocks independent from each other;

the plurality of touch signal lines extend in a first direction and correspond to the plurality of electrode blocks in one-to-one correspondence, and the plurality of touch signal lines are electrically connected to the corresponding electrode blocks, respectively; and the plurality of redundant signal lines extend in the first direction, wherein respective portions of each of the redundant signal lines located between adjacent ones of the plurality of electrode blocks in the first direction are disconnected to form redundant sub-conductive lines corresponding to each of the plurality of the electrode blocks, and the redundant sub-conductive lines are electrically connected to corresponding electrode blocks, respectively.

In the above display panel, in the first direction, projections of the touch signal lines on the common electrode layer cover all the electrode blocks, and the touch signal lines are only electrically connected to the corresponding electrode blocks. The respective portions of each of the redundant signal lines located between adjacent two electrode blocks in the first direction are disconnected, so that each of the electrode blocks corresponds to independent redundant sub-conductive lines, and the redundant sub-conductive lines are electrically connected to the electrode block. In the above design, the touch signal lines are electrically connected to the electrode blocks to provide electrical signals to the electrode blocks, and the redundant sub-conductive lines are electrically connected to the corresponding electrode blocks. Since the common electrode layer is multiplexed as a touch electrode, time-sharing driving can be achieved. Therefore, while each of the electrode blocks realizes the time-sharing driving of a common electrode signal and a touch signal, the corresponding redundant sub-conductive lines are also time-sharing driven.

Therefore, in the above display panel, the respective portions of each of the redundant signal lines located between adjacent two electrode blocks in the first direction are disconnected, and the redundant sub-conductive lines corresponding to each of the electrode blocks are electrically connected to the corresponding electrode block, so that it avoids that inner and outer frames are too wide due to an increase in traces caused by an excessive number of redundant signal lines, thereby achieving a design with narrow frames. In addition, for special-shaped products, since each of the electrode blocks corresponds to the corresponding redundant sub-conductive lines, the above design solves a problem of difficulty in routing the redundant signal lines.

In some embodiments, the touch signal lines and the redundant signal lines are disposed in different layers from the common electrode layer.

In some embodiments, a dielectric layer is disposed between the redundant sub-conductive lines and a corresponding electrode block, and the dielectric layer is provided with a plurality of vias to electrically connect the redundant sub-conductive lines with the corresponding electrode block.

In some embodiments, an opening is disposed in an effective display area of the display panel, and the touch signal lines corresponding to the electrode blocks coupled to the opening are disposed along a periphery of the opening.

In some embodiments, the electrode blocks on sides of the display panel have irregular shapes.

In some embodiments, the display panel further includes a black matrix layer disposed on a side of the second substrate facing the first substrate, wherein orthographic projections of gaps between every two adjacent electrode blocks on the second substrate are located within an orthographic projection of the black matrix layer on the second substrate, and orthographic projections of the touch signal lines and the redundant signal lines on the second substrate are located within the orthographic projection of the black matrix layer on the second substrate.

In some embodiments, the display panel further includes a pixel electrode layer disposed on the side of the first substrate facing the second substrate, wherein the pixel electrode layer and the common electrode layer are disposed in different layers, and the touch signal lines and the redundant signal lines are located between the pixel electrode layer and the common electrode layer.

In some embodiments, the display panel further includes gate signal lines and data signal lines disposed on the side of the first substrate facing the second substrate, wherein extension directions of the touch signal lines and the redundant signal lines are both same as an extension direction of the data signal lines.

In some embodiments, pixels are formed in areas surrounded by two adjacent gate signal lines and the data signal lines, two gate signal lines are disposed between every two adjacent pixels in the first direction to provide gate scanning signals to two rows of pixels, respectively; and wherein the touch signal lines and the redundant signal lines are both disposed in a same layer as the data signal lines.

The present disclosure also provides a display device, including the display panel according to any one of the above embodiments, and a touch display chip;

wherein, the touch display chip is configured to input common electrode signals and touch signals of the electrode blocks.

DETAILED DESCRIPTION

Technical solutions in embodiments of the present disclosure will be described clearly and completely in conjunction with drawings in the embodiments of the present disclosure. Obviously, the described embodiments are only a part of the embodiments of the present disclosure, but not all of them. Based on the embodiments of the present disclosure, all other embodiments obtained by those of ordinary skill in the art without making creative work fall within the protection scope of the present disclosure.

Figure 1:
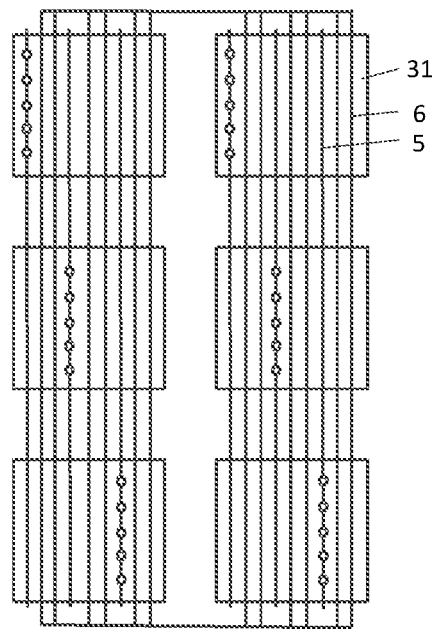
FIG. 1 is a schematic structural diagram of a common electrode layer in the prior art.

When an In-cell touch display panel is to be designed, a common electrode for display is usually multiplexed as a touch electrode and is driven in a time-sharing manner in order to reduce a volume of the display panel. This usually requires adding an additional layer to manufacture touch signal lines 5, or the touch signal lines 5 are disposed in a same layer as data signal lines in order to reduce pixel aperture ratio. In order to ensure uniformity of pixel processes, one line, which is in the same layer with the data signal lines, is additionally disposed in each of pixels, but only a few of the added lines are used as the touch signal lines 5, and a majority of the remaining added lines are used as redundant signal lines 6, as shown in FIG. 1. In an existing design, the redundant signal lines 6 are coupled to the common electrodes around an effective display area. This design is easy to implement for square products. However, for special-shaped products, there are problems such as difficult in routing and wide frames.

Figure 2:
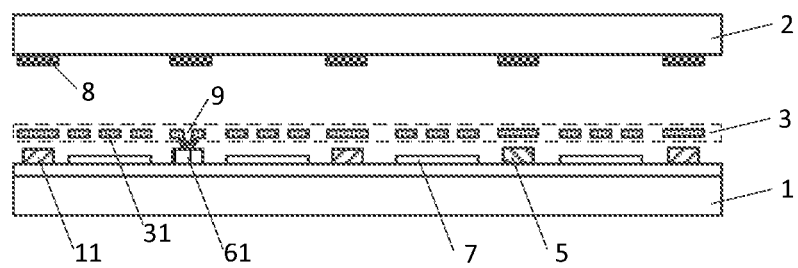
FIG. 2 is a schematic structural diagram of a display panel in the present disclosure.
Figure 3:
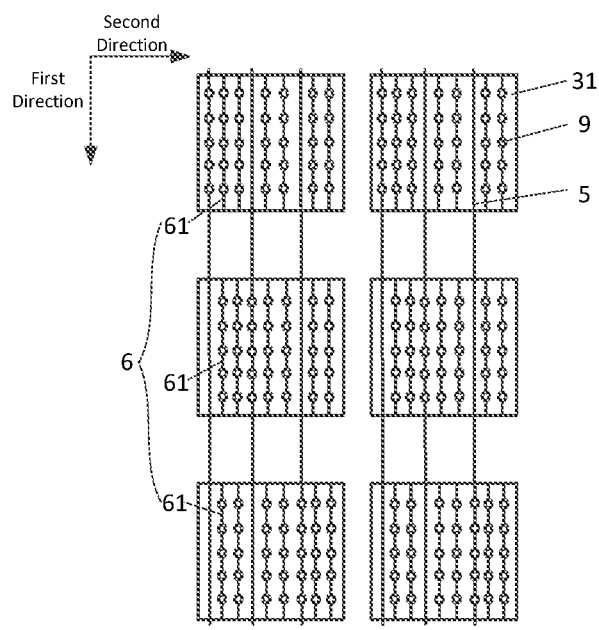
FIG. 3 is a schematic structural diagram of a common electrode layer in the present disclosure.

To solve the above problems, with reference to FIGS. 2 and 3, the present disclosure provides a display panel, including:

a first substrate 1 and a second substrate 2 oppositely disposed; and a common electrode layer 3, a plurality of touch signal lines 5 and a plurality of redundant signal lines 6 disposed on a side of the first substrate 1 facing the second substrate 2; and the common electrode layer 3 includes a plurality of electrode blocks 31 independent from each other;

the plurality of touch signal lines 5 extend in a first direction and correspond to the plurality of electrode blocks 31 in one-to-one correspondence, and the plurality of touch signal lines 5 are electrically connected to the corresponding electrode blocks 31, respectively; and the plurality of redundant signal lines 6 extend in the first direction and are located between two adjacent touch signal lines 5, respectively, and respective portions of each of the redundant signal lines 6 located between adjacent ones of the plurality of electrode blocks 31 in the first direction are disconnected to form redundant sub-conductive lines 61 corresponding to each of the plurality of the electrode blocks 31, and the redundant sub-conductive lines 61 are electrically connected to corresponding electrode blocks 31, respectively.

In the above display panel, in the first direction, projections of the touch signal lines 5 on the common electrode layer 3 cover all the electrode blocks 31, and the touch signal lines 5 are only electrically connected to the corresponding electrode blocks 31. The respective portions of each of the redundant signal lines 6 located between adjacent two electrode blocks 31 in the first direction are disconnected, so that each of the electrode blocks 31 corresponds to independent redundant sub-conductive lines 61, and the redundant sub-conductive lines 61 are electrically connected to the electrode block 31. In the above design, the touch signal lines 5 are electrically connected to the electrode blocks 31 to provide electrical signals to the electrode blocks 31, and the redundant sub-conductive lines 61 are electrically connected to the corresponding electrode blocks 31. Since the common electrode layer 3 is multiplexed as a touch electrode, time-sharing driving can be achieved. Therefore, while each of the electrode blocks 31 realizes the time-sharing driving of common electrode signals and touch signals, the corresponding redundant sub-conductive lines 61 are also time-sharing driven.

Therefore, in the above display panel, the respective portions of each of the redundant signal lines 6 located between adjacent two electrode blocks 31 in the first direction are disconnected, and the redundant sub-conductive lines 61 corresponding to each of the electrode blocks are electrically connected to the corresponding electrode block 31, so that it avoids that inner and outer frames are too wide due to an increase in traces caused by an excessive number of redundant signal lines 6, thereby achieving a design with narrow frames. In addition, for the special-shaped products, since each of the electrode blocks 31 corresponds to the corresponding redundant sub-conductive lines 61, the above design solves a problem of difficulty in routing the redundant signal lines 6.

Specifically, the touch signal lines 5 and the redundant signal lines 6 are both disposed in different layers from the common electrode layer 3, which can avoid blind touch areas caused by a same layer arrangement, thereby improving touch performance.

Figure 4A:
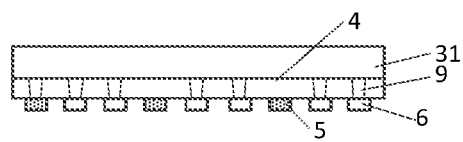
FIGS. 4a-4c are three schematic cross-sectional structure diagrams of a common electrode layer in the present disclosure.
Figure 4B:
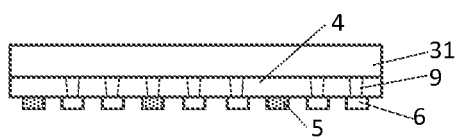
Figure 4C:
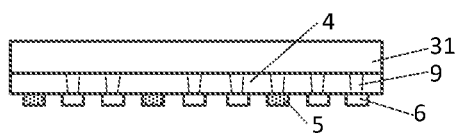

Based on the above arrangement, as shown in FIGS. 4a-4c, it should be noted that FIG. 4a is a schematic cross-sectional structure diagram of an electrode block in a first column and a first row in FIG. 3, FIG. 4b is a schematic cross-sectional structure diagram of an electrode block in the first column and a second row in FIG. 3, and FIG. 4c is a schematic cross-sectional structure diagram of an electrode block in the first column and a third row in FIG. 3. A dielectric layer 4 is disposed between the redundant sub-conductive lines 61 corresponding to each of the electrode blocks 31 and the corresponding electrode block 31, and the dielectric layer 4 is provided with a plurality of vias 9 to facilitate to electrically connect the redundant sub-conductive lines 61 with the corresponding electrode block 31. Through the above electrical connection, an electrode resistance can be greatly reduced, thereby improving signal-to-noise ratio when the electrode transmits a signal.

Figure 5:
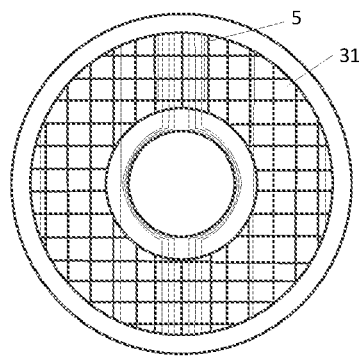
FIG. 5 is a schematic structural diagram of a common electrode layer of a special-shaped product in the present disclosure.
Figure 6:
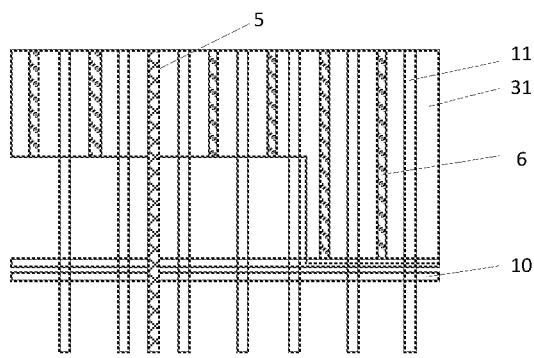
FIG. 6 is a partial enlarged view of an edge electrode block within a special-shaped product in the present disclosure.

Further, the display panel in the present disclosure can be used in the special-shaped products. In one embodiment, as shown in FIG. 5, an effective display area of the display panel has an opening, and the electrode blocks 31 at edges of the ring-shaped effective display area are special-shaped, and data signal lines and the touch signal lines 5 at the opening position are disposed along a periphery of the opening. As shown in FIG. 6, when the electrode blocks 31 on a side of the display panel have irregular shapes, since the number of redundant signal lines 6 is equal to the number of data signal lines 11, if an existing connection method for the redundant signal lines 6 is adopted, all the redundant signal lines 6 need to be coupled to the redundant signal lines 6 at the other end around the opening, which requires large space to lead to wide frames. Therefore, the connection method in the present disclosure in which each of the electrode blocks 31 is electrically connect to the corresponding redundant sub-conductive lines 61 greatly reduces widths of frames.

Further, the display panel in the present disclosure further includes a black matrix layer 8 disposed on a side of the second substrate 2 facing the first substrate 1, orthographic projections of gaps between every two adjacent electrode blocks 31 on the second substrate 2 are located within an orthographic projection of the black matrix layer 8 on the second substrate 2, and orthographic projections of the touch signal lines 5 and the redundant signal lines 6 on the second substrate 2 are located within the orthographic projection of the black matrix layer 8 on the second substrate 2, so that aperture ratio of the display panel in the present disclosure can be ensured.

Further, the display panel in the present disclosure further includes a pixel electrode layer 7 disposed on the side of the first substrate 1 facing the second substrate 2, the pixel electrode layer 7 and the common electrode layer 3 are disposed in different layers, and the touch signal lines 5 and the redundant signal lines 6 are located between the pixel electrode layer 7 and the common electrode layer 3. In the above design, the dielectric layer 4 between the pixel electrode layer 7 and the common electrode layer 3 can be used to isolate the common electrode layer 3 from the touch signal lines 5 and the redundant signal lines 6, and the touch signal line 5 and the redundant signal lines 6 are electrically connected to the common electrode layer 3 through the vias 9 in the dielectric layer 4.

Further, the display panel in the present disclosure further includes gate signal lines 10 and data signal lines 11 disposed on the side of the first substrate 1 facing the second substrate 2, and an extension direction of the redundant signal lines 6 is same as an extension direction of the data signal lines 11. In addition, in order to reduce production cost, the redundant signal lines 6 and the data signal lines 11 can be disposed in the same layer.

Figure 7:
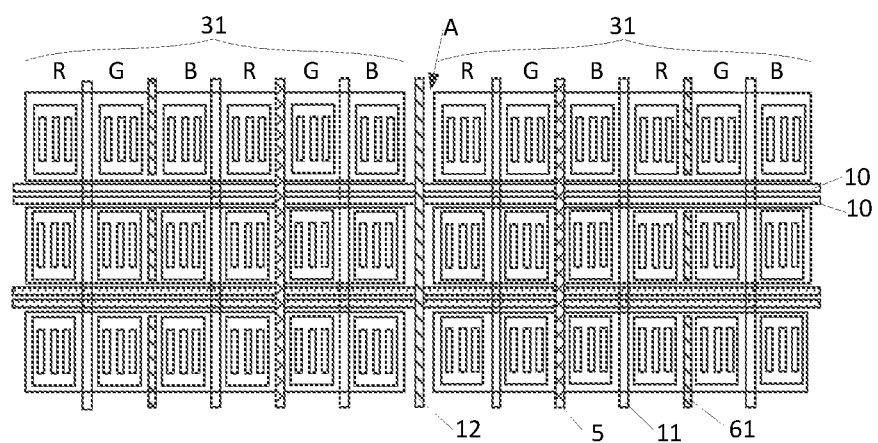
FIG. 7 is a schematic structural diagram of a pixel electrode layer in the present disclosure.

In a possible implementation, as shown in FIG. 7, the display panel in the present disclosure adopts a double-gate structure, that is, pixels are formed in areas surrounded by two adjacent gate signal lines 10 and the data signal lines 11, two gate signal lines 10 are disposed between every two adjacent pixels in the first direction to provide gate scanning signals to two rows of pixels, respectively. The touch signal lines 5 and the redundant signal lines 6 are disposed in a same layer as the data signal lines 11. As shown in FIG. 7, the respective portions of each of the redundant signal lines 6 located between two adjacent electrode blocks in the first direction are disconnected to form a plurality of redundant sub-conductive lines 61. In contrast, the touch signal lines 5 and the data signal lines 11 are continuous in the first direction. In a second direction, the touch signal line 5 or the redundant signal line 6 is located between two adjacent pixels, that is, the touch signal line 5 or the redundant signal line 6 is located between two data lines. And a region A between two adjacent electrode blocks 31 in the second direction is exactly a region between two pixels. It should be noted that a signal lines 12 may be disposed in the region A between two adjacent electrode blocks 31 in the second direction. Since this signal line 12 does not pass through any pixel unit or electrode block 31, the signal line 12 does not need to be disconnected, and the signal line 12 can be used as the touch signal line or as the redundant signal line, so as to ensure that sub-pixels display normally. By providing the double-gate structure, the data signal lines 11 between every adjacent two pixels can be saved, so that the touch signal line 5 can be disposed at the gap between adjacent two sub-pixels and in the same layer as the data signal lines 11.

Based on the same idea, the present disclosure also provides a display device, including the display panel with any one of the above features and a touch display chip, and the touch display chip is configured to input common electrode signals, touch signals, gate signals and data signals of the electrode blocks 31. In the display device, the respective portions of each of the redundant signal lines 6 located between adjacent two electrode blocks 31 in the first direction are disconnected, and the redundant sub-conductive lines 61 corresponding to each of the electrode blocks are electrically connected to the corresponding electrode block 31, so that it avoids that inner and outer frames are too wide due to an increase in traces caused by an excessive number of redundant signal lines 6, thereby achieving a design with narrow frames. In addition, for the special-shaped products, since each of the electrode blocks 31 corresponds to the corresponding redundant sub-conductive lines 61, the above design solves a problem of difficulty in routing the redundant signal lines 6.

Obviously, those skilled in the art can make various modifications and variations to the embodiments of the present disclosure without departing from the spirit and scope of the present disclosure. As such, if these modifications and variations of the present disclosure fall within the scope of the claims of the present disclosure and equivalent technologies thereof, the present disclosure is also intended to include these modifications and variations.

What is claimed is:

1. A display panel, comprising:
    a first substrate and a second substrate oppositely disposed; and
    a common electrode layer, a plurality of touch signal lines, and a plurality of redundant signal lines disposed on a side of the first substrate facing the second substrate;
    wherein, the common electrode layer comprises a plurality of electrode blocks independent from each other;
    the plurality of touch signal lines extend in a first direction and correspond to the plurality of electrode blocks in one-to-one correspondence, and the plurality of touch signal lines are electrically connected to the corresponding electrode blocks, respectively; and
    the plurality of redundant signal lines extend in the first direction, wherein respective portions of each of the redundant signal lines located between adjacent ones of the plurality of electrode blocks in the first direction are disconnected to form redundant sub-conductive lines corresponding to each of the plurality of the electrode blocks, and the redundant sub-conductive lines are electrically connected to corresponding electrode blocks, respectively.

2. The display panel according to claim 1, wherein the touch signal lines and the redundant signal lines are disposed in different layers from the common electrode layer.

3. The display panel according to claim 2, wherein a dielectric layer is disposed between the redundant sub-conductive lines and a corresponding electrode block, and the dielectric layer is provided with a plurality of vias to electrically connect the redundant sub-conductive lines with the corresponding electrode block.

4. The display panel according to claim 1, wherein an opening is disposed in an effective display area of the display panel, and the touch signal lines corresponding to the electrode blocks coupled to the opening are disposed along a periphery of the opening.

5. The display panel according to claim 1, wherein the electrode blocks on sides of the display panel have irregular shapes.

6. The display panel according to claim 1, further comprising a black matrix layer disposed on a side of the second substrate facing the first substrate, wherein orthographic projections of gaps between every two adjacent electrode blocks on the second substrate are located within an orthographic projection of the black matrix layer on the second substrate, and orthographic projections of the touch signal lines and the redundant signal lines on the second substrate are located within the orthographic projection of the black matrix layer on the second substrate.

7. The display panel according to claim 6, further comprising a pixel electrode layer disposed on the side of the first substrate facing the second substrate, wherein the pixel electrode layer and the common electrode layer are disposed in different layers, and the touch signal lines and the redundant signal lines are located between the pixel electrode layer and the common electrode layer.

8. The display panel according to claim 6, further comprising gate signal lines and data signal lines disposed on the side of the first substrate facing the second substrate, wherein extension directions of the touch signal lines and the redundant signal lines are both same as an extension direction of the data signal lines.

9. The display panel according to claim 8, wherein pixels are formed in areas surrounded by two adjacent gate signal lines and the data signal lines, two gate signal lines are disposed between every two adjacent pixels in the first direction to provide gate scanning signals to two rows of pixels, respectively; and wherein the touch signal lines and the redundant signal lines are both disposed in a same layer as the data signal lines.

10. A display device, comprising a display panel and a touch display chip;
wherein the display panel comprises:
a first substrate and a second substrate oppositely disposed; and
a common electrode layer, a plurality of touch signal lines, and a plurality of redundant signal lines disposed on a side of the first substrate facing the second substrate;
wherein, the common electrode layer comprises a plurality of electrode blocks independent from each other;
the plurality of touch signal lines extend in a first direction and correspond to the plurality of electrode blocks in one-to-one correspondence, and the plurality of touch signal lines are electrically connected to the corresponding electrode blocks, respectively; and
wherein respective portions of each of the redundant signal lines located between adjacent ones of the plurality of electrode blocks in the first direction are disconnected to form redundant sub-conductive lines corresponding to each of the plurality of the electrode blocks, and the redundant sub-conductive lines are electrically connected to corresponding electrode blocks, respectively; and
wherein the touch display chip is configured to input common electrode signals and touch signals of the electrode blocks.

11. The display device according to claim 10, wherein the touch signal lines and the redundant signal lines are disposed in different layers from the common electrode layer.

12. The display device according to claim 11, wherein a dielectric layer is disposed between the redundant sub-conductive lines and the corresponding electrode block, and the dielectric layer is provided with a plurality of vias to electrically connect the redundant sub-conductive lines with the corresponding electrode block.

13. The display device according to claim 10, wherein an opening is disposed in an effective display area of the display panel, and the touch signal lines corresponding to the electrode blocks coupled to the opening are disposed along a periphery of the opening.

14. The display device according to claim 10, wherein the electrode blocks on sides of the display panel have irregular shapes.

15. The display device according to claim 10, further comprising a black matrix layer disposed on a side of the second substrate facing the first substrate, wherein orthographic projections of gaps between every two adjacent electrode blocks on the second substrate are located within an orthographic projection of the black matrix layer on the second substrate, and orthographic projections of the touch signal lines and the redundant signal lines on the second substrate are located within the orthographic projection of the black matrix layer on the second substrate.

16. The display device according to claim 15, further comprising a pixel electrode layer disposed on the side of the first substrate facing the second substrate, wherein the pixel electrode layer and the common electrode layer are disposed in different layers, and the touch signal lines and the redundant signal lines are located between the pixel electrode layer and the common electrode layer.

17. The display device according to claim 15, further comprising gate signal lines and data signal lines disposed on the side of the first substrate facing the second substrate, wherein extension directions of the touch signal lines and the redundant signal lines are both same as an extension direction of the data signal lines.

18. The display device according to claim 17, wherein pixels are formed in areas surrounded by two adjacent gate signal lines and the data signal lines, two gate signal lines are disposed between every two adjacent pixels in the first direction to provide gate scanning signals to two rows of pixels, respectively; and wherein the touch signal lines and the redundant signal lines are both disposed in a same layer as the data signal lines.

* * * * *